(12) United States Patent  
Chatterjee et al.

(10) Patent No.: US 7,747,591 B2  
(45) Date of Patent: *Jun. 29, 2010

(54) WEB FEATURE SERVICE (WFS) LOCKING SUPPORT BASED ON LIGHT-WEIGHT LOCKING MODEL IN THE DATABASE

(75) Inventors: Raja Chatterjee, Nashua, NH (US); Siva Ravada, Nashua, NH (US)

(73) Assignee: Oracle International Corp., Redwood Shores, CA (US)

( * ) Notice: Subject to any disclaimer, the term of this patent is extended or adjusted under 35 U.S.C. 154(b) by 784 days.

This patent is subject to a terminal disclaimer.

(21) Appl. No.: 11/388,308

(22) Filed: Mar. 24, 2006

(65) Prior Publication Data

US 2007/0226217 A1    Sep. 27, 2007

(51) Int. Cl.
*G06F 17/30* (2006.01)

(52) U.S. Cl. .................. 707/704; 707/694; 707/703
(58) Field of Classification Search .............. 707/1–3, 707/8, 10, 200–203; 711/168
See application file for complete search history.

(56) References Cited

U.S. PATENT DOCUMENTS

| | | | | |
|---|---|---|---|---|
| 5,261,069 A | * | 11/1993 | Wilkinson et al. | 711/145 |
| 5,524,241 A | * | 6/1996 | Ghoneimy et al. | 707/10 |
| 5,809,503 A | * | 9/1998 | Aoshima | 707/8 |
| 5,983,225 A | * | 11/1999 | Anfindsen | 707/8 |
| 6,275,863 B1 | * | 8/2001 | Leff et al. | 709/248 |
| 2004/0068563 A1 | * | 4/2004 | Ahuja et al. | 709/225 |
| 2005/0134902 A1 | * | 6/2005 | Mihira et al. | 358/1.15 |
| 2006/0123003 A1 | * | 6/2006 | Lightstone et al. | 707/8 |
| 2006/0242110 A1 | * | 10/2006 | Goldstein | 707/1 |

* cited by examiner

*Primary Examiner*—Cam-Linh Nguyen  
(74) *Attorney, Agent, or Firm*—Kraguljac & Kalnay, LLC

(57) ABSTRACT

Locking feature instances in a web feature service by processing a web feature service data transformation request; identifying a table associated with the web feature service data transformation request from a feature type identified in the request; determining if the table associated with the web feature service data transformation request is enabled for long transaction locking; and, if the table is long transaction lock enabled, locking at least one feature instance associated with a filter condition of the web feature service data transformation request by associating a session transferable identifier with the at least one feature instance and identifying the client session as owner of the session transferable identifier; and enabling a transfer of the long transaction lock to another client session in response to a lock transfer request from the another client session that references the session transferable identifier in a web feature service transaction request.

20 Claims, 11 Drawing Sheets

WEB FEATURE SERVICE (WFS) LOCKING SUPPORT BASED ON LIGHT-WEIGHT LOCKING MODEL IN THE DATABASE

CROSS-REFERENCE TO RELATED APPLICATIONS

This application is related to U.S. patent application Ser. No. 11/388,310, filed on Mar. 24, 2006, the disclosure of which is incorporated herein by reference in its entirety.

BACKGROUND

1. Field

The disclosed embodiments generally relate to relational database systems, and in particular to Web Feature Service ("WFS") locking support based on a light-weight locking model in the database.

2. Brief Description of Related Developments

Web Feature Service Implementation Specification [WFS 1.0.0] proposes interfaces for describing data manipulation operations on geographic features using HTTP as the distributed computing platform. A Web Feature Service (WFS) publishes feature-level geographical data to the web and provides an interface allowing requests for geographical features across the web that are highly interoperable. It uses the XML-based Geographic Mark Up Language (GML) for data exchange. A feature is an object that is an abstraction of a real world phenomenon. An object has a set of properties, that can include for example, a name, a type and a value. On example of a feature is a Road that has a name, location, width, speed limit and jurisdiction. These features can be stored in a database, such as a spatial database, for example. Web Feature services provides for uniform access to these stored features.

A Web Feature Server ("WFS") distributes feature information over the web using XML and provides a protocol for requesting and serving vector data over HTTP and responds to requests by returning data in GML. The Web feature server allows uniform access to features stored on a server and transactions allow a client to modify data on the server. These transactions can include, for example, querying a dataset and retrieving the features, finding a feature's property names and types, adding features to a dataset, updating or deleting features, and locking features to exclusively update a feature instance for a period of time.

The web feature service specification defines interfaces for describing data manipulation operations of geographic features, particularly in a geographic information system ("GIS"). A geographic information system is generally a system that creates and manages spatial data and attributes for geographically referenced information. In a geographic information system, real world objects are represented by digital data. Data capture in a geographic information system is a time consuming process. In many geographic information service applications, there is a need for a user to hold on to, or maintain control of a row, or feature instance, for a long period of time. Data updates or edits in these systems can take hours, days or months, and can span across multiple sessions and database shutdowns, during which time other users may need to access the same database. During the time that the user controls the row or feature instance(s), no other user should be able to implement any changes to the same feature instance(s). Also, as the user makes changes to the feature instance(s), the changes should be made available to others for viewing, but not for updating. Only when the user relinquishes the hold on the row should another user be able to access the same data.

Operations in a Web Feature Service request can include the ability to create a new feature instance, delete a feature instance, update a feature instance, get or query features based on spatial and non-spatial constraints. A web feature service describes discovery, query, or data transformation operations and a web feature service request consists of a description of query or data transformation operations (e.g. create/update/delete) that are to be applied to one or more feature instances. The request is generated on the client and is posted to a web feature server using HTTP. The web feature server then parses (reads) and executes the request.

As Web connections are inherently stateless, the semantics of serializable transactions are not preserved. For example, a client first fetches a feature instance. The feature is then modified on the client side, and submitted back to the database via a transaction request for update. Serializability is lost since there is nothing to guarantee that while the feature was being modified on the client side, another client did not come along and update that same feature in the database.

One way to ensure serializability is to require that any access or modification to data in a database be carried out in a mutually exclusive manner. It is important that while one transaction modifies a data item, no other transaction can modify the same data item. This can be accomplished by using locks that control access to the data.

One approach to long transaction management in geographic information systems and web feature services is versioning. Versioning generally involves storing changes to the database as different revision sets. Users can create new versions of data to update, while maintaining a copy of the old data. Feature instances are locked for use in a specific revision set and prevent conflicts between a parent revision set and a child revision set. The results of the long transaction can be stored persistently. Thus, users are assured that there is concurrency and consistency in the database, at the expense of the use of storage facilities by requiring the need to hold different versions of the same record in one or more revision sets so that users can change the versions independently. In the versioning approach, there is no way to lock feature instances without version-enabling it. The locks are maintained at a version-level. Also using the versioning approach, currently there is no way to obtain a long transaction lock exclusively owned by one session on a feature instance which can later be transferred to another session via a sequential hand-off. It would be advantageous to enable a locking mechanism on feature instances that is long term and transferable across web feature service requests and sessions without the need to consume valuable storage space for maintaining version data, as well as allow a WFS to derive long term and transferable locking parameters from different WFS lock feature requests.

SUMMARY

The disclosed embodiments are directed to long transaction locking of feature instances in a web feature service. In one embodiment, the method comprises processing a web feature service data transformation request; identifying a table associated with the web feature service data transformation request from a feature type identified in the request; determining if the table associated with the web feature service data transformation request is enabled for long transaction locking; and, if the table is long transaction lock enabled: locking at least one feature instance associated with a filter condition of the web feature service data transformation request by associating a session transferable identifier with the at least one feature instance and identifying the client session as owner of the session transferable identifier; and enabling a transfer of the long transaction lock to another client session in response to a lock transfer request from the another client session that references the session transferable identifier in a web feature service transaction request.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE PREFERRED EMBODIMENT(S)

Figure 1:
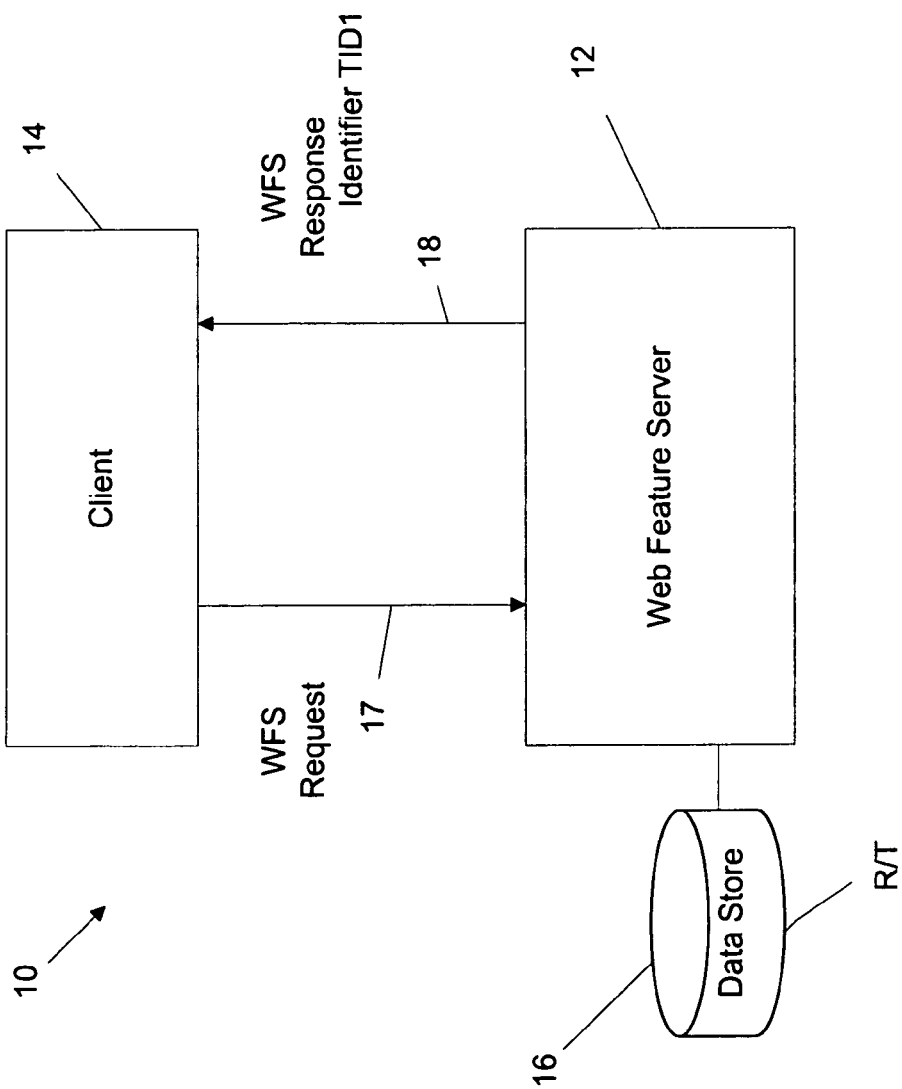
FIG. 1 is a block diagram of one embodiment of a system incorporating features of the disclosed embodiments.

Referring to FIG. 1, a block diagram of one embodiment of a system 10 incorporating features of the disclosed embodiments is illustrated. Although the embodiments disclosed will be described with reference to the embodiments shown in the drawings, it should be understood that the embodiments disclosed can be embodied in many alternate forms of embodiments. In addition, any suitable size.

The disclosed embodiments generally relate to a method for locking feature instances for a period of time during which only the owner of a lock on the feature instance(s) that are subject to the update, as determined by an identifier associated with the lock, can update feature instances during that period and the owner can transfer the lock to other database sessions. This web feature service locking is based on the light-weight long transaction locking model, or exclusive update locks ("EUlocks"), referred to in U.S. patent application Ser. No. 11/388,310, filed on Mar. 24, 2006, the disclosure of which is incorporated herein by reference in its entirety. This locking feature is not the same as and should not be confused with traditional short-duration transactional locks used by database systems that are typically session and privileged based. A short-transaction lock is a regular database lock that is held during the scope of the current session to which it is committed. In the disclosed embodiments, a feature instance(s) can be locked for an extended period of time so that the feature(s) can be consecutively updated by multiple database sessions during that period of time. Only one session can possess ownership of the lock on a feature instance(s) at any point in time, and two users cannot update the same object at the same time. The lock is transferable from one session to another session.

One embodiment of a web feature service interface incorporating features of the disclosed embodiments is illustrated in FIG. 1. The web feature service or server 12 can access or include a datastore 16 that stores the geographic features. The web feature server 12 is a module of the system 10 that supports transactions and/or query operations on web accessible features in the datastore 16. The datastore 16 is generally utilized to store and manage the spatial and nonspatial properties of geographic features, and can comprise, in one embodiment, a relational database system. For example, in a database application the geographic features can be stored as rows R in tables T. Generally, the data store 16 is opaque to the client or client application 14. The client application 14 can comprise any program or process that communicates with a web server (not shown), using for example HTTP. Generally, the client 14 interfaces with the web server (not shown), which in turn communicates with the web feature server 12. In one embodiment, the client application 14 can comprise a web browser.

The client view of the data in the datastore 16 is through the web feature service interface 10. A web feature service describes discovery, query, or data transformation operations and a web feature service request consists of a description of query or data transformation operations (e.g. create/update/delete) that are to be applied to one or more feature instances. The request is generated on the client and is posted to a web feature server using HTTP (which can be served up by a suitable web server (not shown). The web feature server 12 then parses (reads) and executes the request.

If for example, referring to FIG. 1, the user or client 14 may wish to update one or more features of the datastore 16, the update may take place over an Internet connection and can extend for a long period of time, such as in a transaction or project. In alternate embodiments, the update of the feature instance(s) can be carried out over any suitable communication medium. Feature instances of a certain feature type are stored in a database table/view, and given a feature type (featureType), the table T which stores the instances/rows for that feature type can be uniquely determined.

Figure 2:
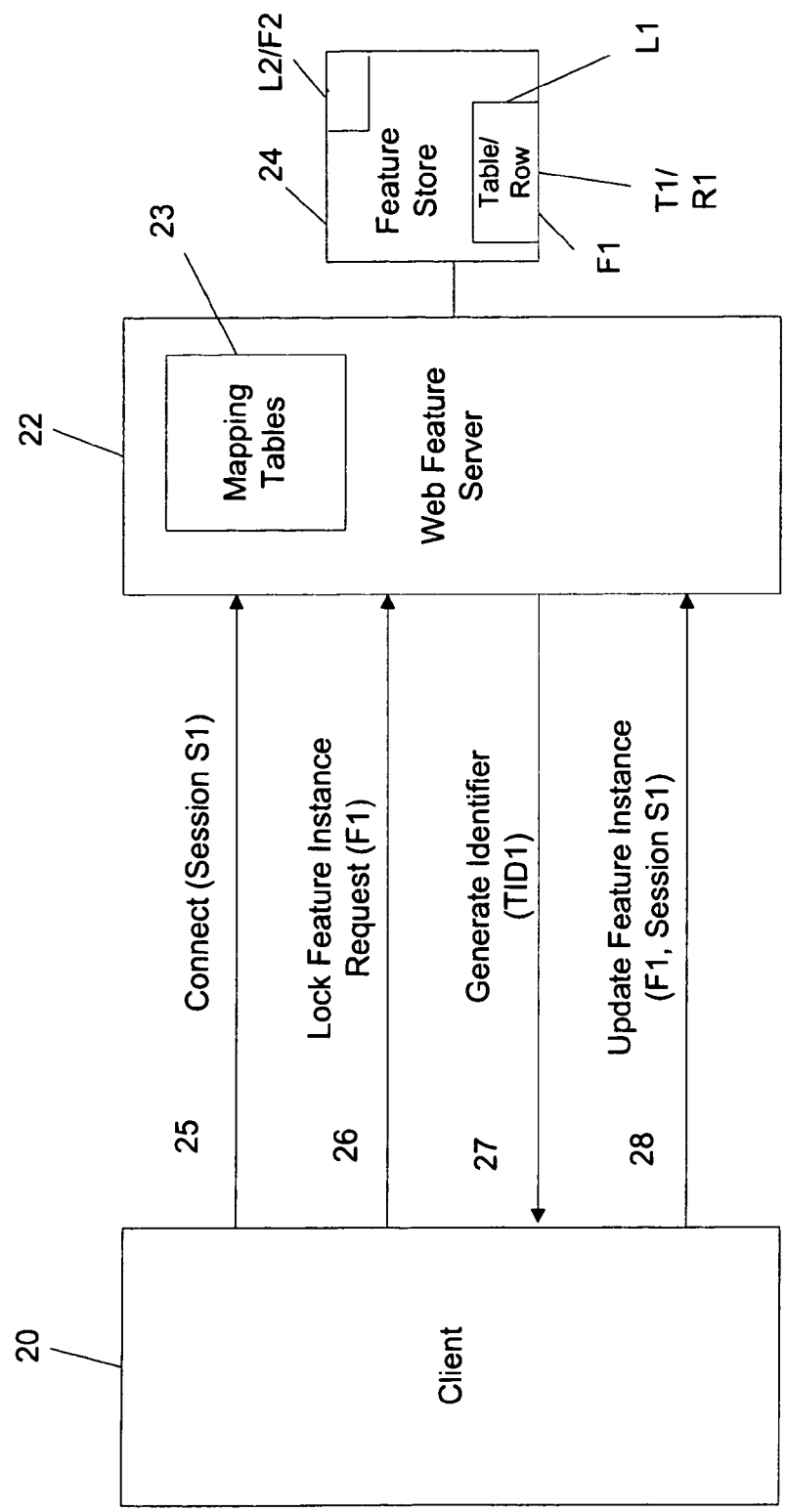
FIG. 2 is a block diagram illustrating one embodiment of a successful update in a system incorporating features of the disclosed embodiments.
Figure 5:
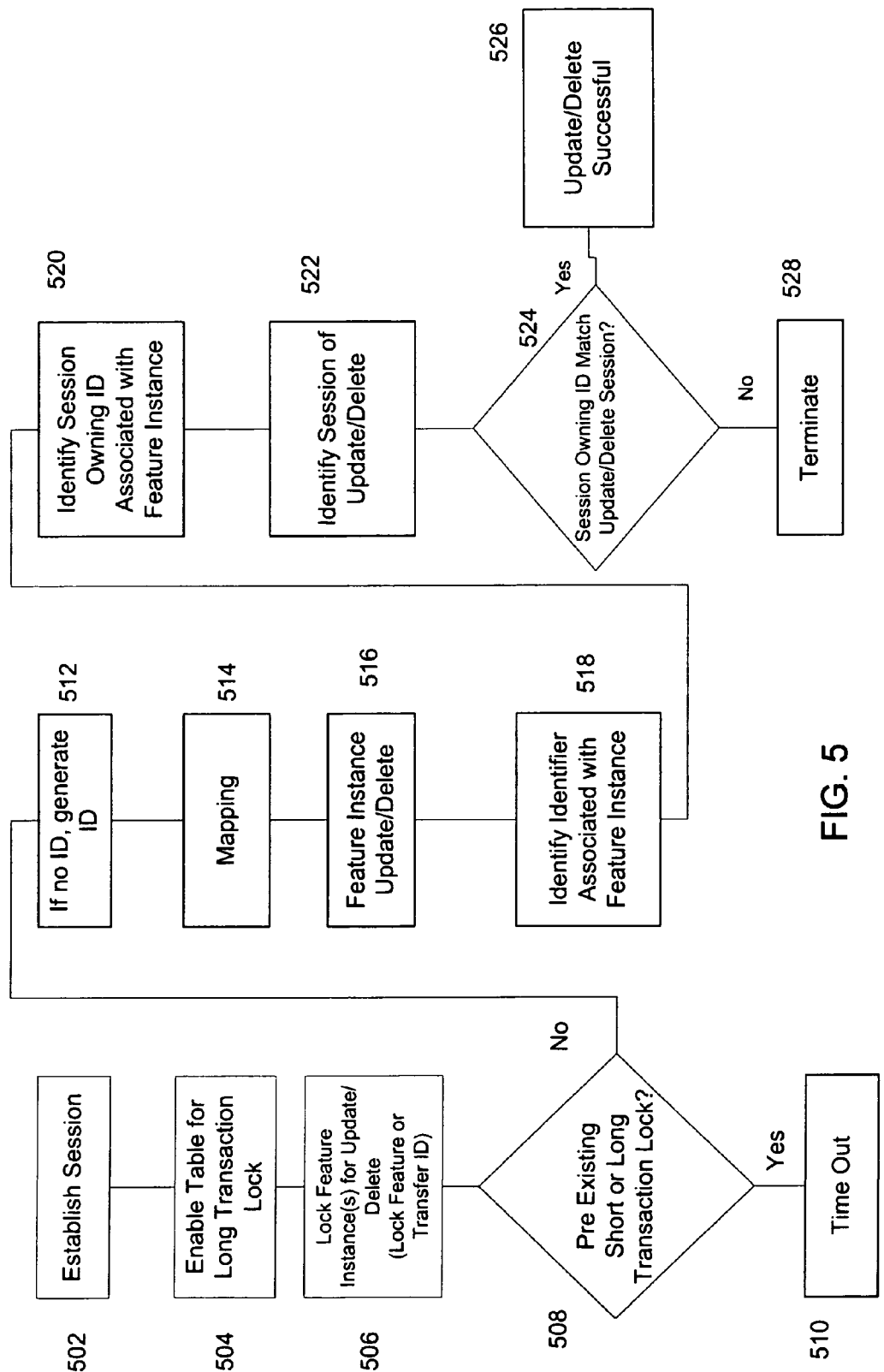
FIG. 5 is a flowchart illustrating one embodiment of a method incorporating features of the disclosed embodiments.

Referring to FIGS. 2 and 5, the client 20 establishes 502 a session S1 with the web feature server 22 to access and update one or more feature instance(s) F1 of the datastore 16. The transactions can include for example, insert, update, delete or native (system specific implementations) transactions. The transactions generally comprise operator interfaces to change a state of services.

The feature table T1 of the web feature service must be registered 504 as a long transaction feature table. In one embodiment, a feature table is registered for enabling long transaction locks on it by generating and installing triggers in the database that perform checks to ensure that only the session which owns the identifier associated with a feature instance can perform an update/delete on the feature instance. In one aspect, the disclosed embodiments can utilize a token identifier based locking mechanism for long transactions. The identifier can comprise a logical entity that can be owned by only one session at a time. The identifier associates the lock on the feature instance(s) with a particular session. Only the session that is designated as the owner of the identifier will be able to perform any kind of update/delete on the feature instance(s) associated with the identifier.

For example, in one embodiment, the web feature service server 12 of FIG. 1 can register the table that stores the feature instances as a feature table using the procedure registerFeatureTable(p_userName (IN), p_featureTable (IN)), where the table is labeled by the user name and table name. The p_userName, and p_featureTable parameter value by the Web Feature Server will be derived from the "typeName" attribute in the WFS Lock request, or from the payload of the WFS transaction request. Feature instances of a certain type are stored in a database table/view. A feature instance is a row of a feature table. Given a feature type, one can uniquely determine the tables that store the instances/rows for that feature type. In one embodiment, in processing a web feature service data transformation request, the table associated with the feature type that is the subject of the web feature service data transformation request is identified or derived from the request and it is determined whether the table is registered or enabled for long transaction locking. If the table is long transaction lock enabled, at least one feature instance associated with a filter condition of the web feature service data transformation request is locked by associating a session transferable identifier with the at least one feature instance and identifying the client session as owner of the session transferable identifier. Each feature type will have a filter condition associated with it. The filter condition associated with a feature type in a WFS lock feature request indicates which instances of that feature type need to be locked. The filter condition associated with a Update or Delete sub-request for a feature type in a WFS transaction request (note one WFS transaction request can contain multiple Update/Delete sub-requests), indicates which instances of that feature type needs to be updated or deleted respectively.

To register or enable the table as a long transaction lock enabled table, the system generates and installs database triggers that allow checks to be performed on the table before any update/delete to determined whether the current session that is performing the update/delete owns the necessary identifier that associates the session and the lock on the feature instance that will authorize the session to perform the update/delete. The identifier, which can also be referred to as a token, is associated with the current session that has authorization for the update/delete and ensures that two user sessions cannot update the same object or feature instance at the same time.

Generally, three attributes are recorded and utilized to implement the disclosed embodiments. The user's session, token identifier and row identifier ("rowID"). The token identifier ("TID") generally represents a lock identifier that locks a feature/row, while the rowID uniquely refers to the feature instance requested to be or being updated/deleted. For a session transaction to go through, the session needs to own the token identifier that represents the lock associated with the rowID that is going to be updated/deleted in the transaction.

A process for enabling long transaction locking in accordance with the disclosed embodiments will be described with reference to FIGS. 2 and 5. The client application 20 will initiate or establish 502 a session S1. If the client 20 desires a long transaction lock in accordance with the features of the disclosed embodiments, the client 20 will register or enable 504 the table as long transaction lock enabled table. Once the table T1 of FIG. 2 is enabled 504 as a long transaction feature table, the client 20 selects 506 the feature instance(s) that are desired to be changed, and requests or invokes 506 a transaction lock on the selected feature instance. A web feature service client 20 can request locks on multiple feature instances belonging to different feature types in a single web request. This request can include for example, a LockFeature or Transaction Request. A lock feature request is generally a request to lock one or more instances of a feature type for the duration of a transaction. A transaction request includes operations to modify geographic features. Note that for a transaction request, if the feature instances to be updated/deleted are not currently locked, then they are first locked and then updated/delete to ensure consistency. The requests are also described in WFS Specification 1.0.0. For the first feature instance the WFS client 20 wants to obtain a lock and/or update in a web request, the WFS Server 22 will need to first lock the feature instance(s) F1 of interest. A suitable API can be used to lock the feature instances. The WFS server 22 will derive the locking model API invocation parameters from the different WFS lock feature requests. In one embodiment, the locking of these particular features can be invoked via: function lockRows(p_featureTable (IN), p_tableAlias (IN), p_whereClause (IN), p_expiryTime (IN), p_rowsLocked (OUT), p_rowsNotLocked (OUT), p_lockall (IN), p_auto_commit (IN)) return number (tokenId). Whether a parameter is IN or OUT is defined inline. The IN parameters for all API invocations will be generated from the WFS client request (a WFS Request as per WFS-transaction.xsd) which is passed to the WFS Server 22. The p_featureTable parameter value will be derived from the "typeName" attribute of the WFS LockFeature Request. The p_whereClause parameter value will be derived from the "filter" condition associated with the corresponding feature type name, specified in the WFS LockFeature Request. The p_tableAlias parameter will be the alias name of the p_featureTable as referred to in the p_whereClause parameter. The p_expiryTime parameter value will be derived from the "expiry" attribute specified in the WFS LockFeature Request, and generally comprises a duration of the requested lock. The p_lockAll parameter will be derived from the "lockAction" attribute of the WFS LockFeature Request. If the parameter is ALL, then all rows or features must be locked for the request to be successful. If the parameter is SOME, then only those rows that can be locked are locked for the request to be successful.

If the locking API of the disclosed embodiments can successfully lock the feature instance(s) F1 requested, then web feature service server 22 will return an identifier TID1 which the WFS client application 20 can save for using in future web requests, by itself or other WFS client applications. The commit for the transaction is done by the WFS Server 22 at the end of the web request, so p_autocommit will be 'False'. This will enable the WFS server 22 to rollback any changes in the locking metadata if there is an exception during any step of the web request execution.

Figure 6:
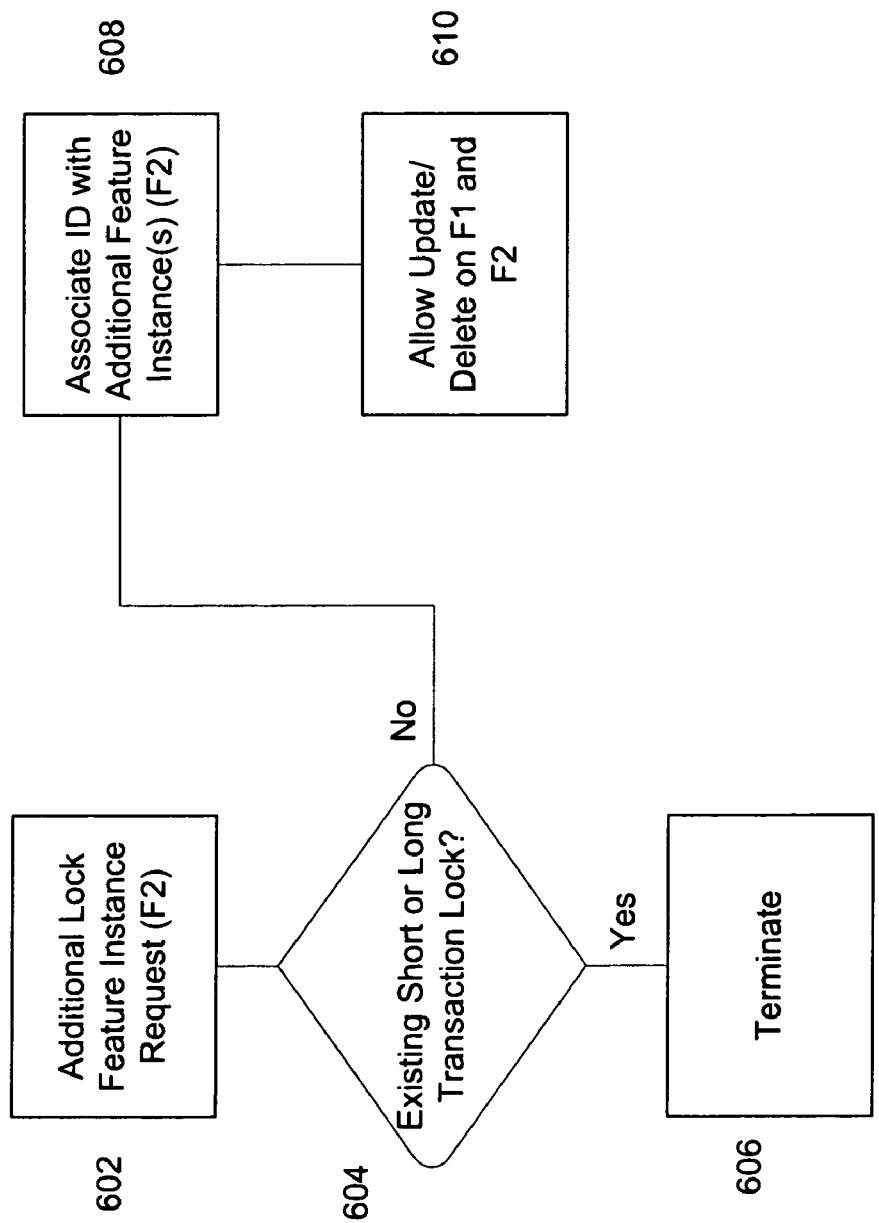
FIG. 6 is a flowchart illustrating one embodiment of a method to lock additional features in a system incorporating features of the disclosed embodiments.

Referring also to FIG. 6, within the scope of the same web request or session S1, the WFS Server 22 can lock other instances belonging to the same or different feature types, and associate these additional, locked feature instance(s) F2 with the same identifier TID1. The request 602 to lock additional feature instances F2 will include the identifier TID1 associated with the session S1 owning the current long transaction lock. In alternate embodiments, any suitable mechanism can be used to expand a scope of an existing long transaction lock, as described herein, to encompass additional feature instances. If it is determined 604 that the additional feature instance F2 is not currently locked by another transaction lock, either a short transaction lock or a long transaction lock, the additional feature instance F2 will now be associated 608 with the previously generated identifier TID1. If it is determined 604 that the feature instance F2 is already locked, the request 602 will terminate or timeout 606. The identifier TID1 is still owned by the session S1 and feature instance(s) F1 remain locked by lock L1.

If there is no existing lock on F2, a lock on the additional feature instance F2 is set 608 as requested, and the identifier TID1 owned by the session S1 is associated with the lock L1 and L2 on feature instances F1 and F2, respectively. From this session S1, the client 20 can perform 610 changes to the feature instances F1 and F2.

In one embodiment, a WFS client can request locks on multiple feature instances belonging to different feature types in a single web request via the WFS lockFeature. For the first feature instance, F1, the WFS want to obtain a lock on or update in a web request, the WFS server will need to first lock the feature instances of interest. In one embodiment, this comprises invoking the API function lockRows(p_featureTable (IN), p_tableAlias (IN), p_whereClause (IN), p_expiryTime (IN), p_rowsLocked (OUT), p_rowsNotLocked (OUT), p_lockAll (IN), p_auto_commit (IN)) return number (tokenId). Whether a parameter is IN or OUT is defined inline. The IN parameters for all API invocations will be generated from the WFS Client request (a WFS Request as per WFS-transaction.xsd) which is passed to the WFS Server. If this API can successfully lock the row(s) requested then it will return an identifier to the WFS Server and WFS Client, such as a tokenId, which the WFS client application can save for using in future web request. The commit is done by the WFS Server at the end of the web request. This will enable the WFS server to rollback any changes in the locking metadata if there is a exception during any of step of the web request execution.

If, within the scope of the same web request, the WFS server has to lock other feature instances belonging to the same or different feature types, the request to lock additional feature instances can be carried out by invoking a lock rows call. In one embodiment, this comprises invoking the API lockrows(p_tokenId (IN), p_featureTable (IN), p_tableAlias (IN), p_whereClause (IN), p_expiryTime (IN), p_rowsLocked (OUT), p_rowsNotLocked (OUT), p_lockAll (IN), p_auto-commit (IN))API. The first parameter, p_tokenId, is the same token identifier returned by the first lockrows( ) invocation in that web request. Thus, one identifier will be responsible for locking instances of different feature types and only the one identifier, TID1, will be returned to the client 20 at the end of a single web request for use in future web requests, if needed. The p_lockAll parameter is derived from the lockAction attribute if the WFS lockFeature request. Its value can be SOME or ALL. If the value is ALL, then an exception is raised if all the requested feature instances cannot be locked. If the value is SOME, then the WFS Server can lock a subset of the requested feature instances that are not locked already at that point in time. The other parameters of the lockRows( ) call will are derived as discussed previously.

The WFS Server 22 can update/delete the feature instance(s) that is locked as part of the web request (by a WFS Transaction Request), and optionally choose to unlock the feature instance(s) at the end of the request. In one embodiment, unlocking the feature instance comprises using the procedure unLockRows(p_tokenId (IN), p_featureTable (IN), p_tableAlias (IN), p_whereClause (IN), p_auto_commit (IN)) API, based on the parameters of the WFS transaction request's releaseAction parameter value. If the releaseAction is ALL, then all of the feature instances locked by the lock associated with the identifier will be released at the end of the web request. If the releaseAction is SOME, then only those locks on the rows of the feature instances that are updated will be released, and the other rows that were not updated in the current request will remain locked until the lock expires, or is otherwise released. The p_whereClause parameter will be generated by the WFS Server appropriately to unlock the desired rows at the end of processing the WFS transaction request in accordance with the releaseAction parameter of the WFS Transaction Request. The parameters of the unLockRows( ) call are derived as discussed previously.

For example, in one embodiment, a WFS LockFeature request can be made up of (FeatureType_1, filter_condition_1) (FeatureType_2, filter_condition_2), . . . (FeatureType_N, filter_condition_N). However there is only one lockAction parameter per WFS LockFeature Request.

Similarly a WFS Transaction Request can be made up of (Update OR Delete, FeatureType_1, filter_condition_1), (Update OR Delete, FeatureType_2, filter_condition_2), (Update OR Delete, FeatureType_3, filter_condition_3) . . . (Update OR Delete, FeatureType_N, filter_condition_N). However there is only one releaseAction parameter per WFS Transaction Request. The WFS Transaction Request can have Insert sub-requests as well, besides the Update/Delete sub-request described above. Since an Insert sub-request will create a new feature instance in the feature repository, no locking/unlocking is necessary to process Insert sub-requests.

Figure 10:
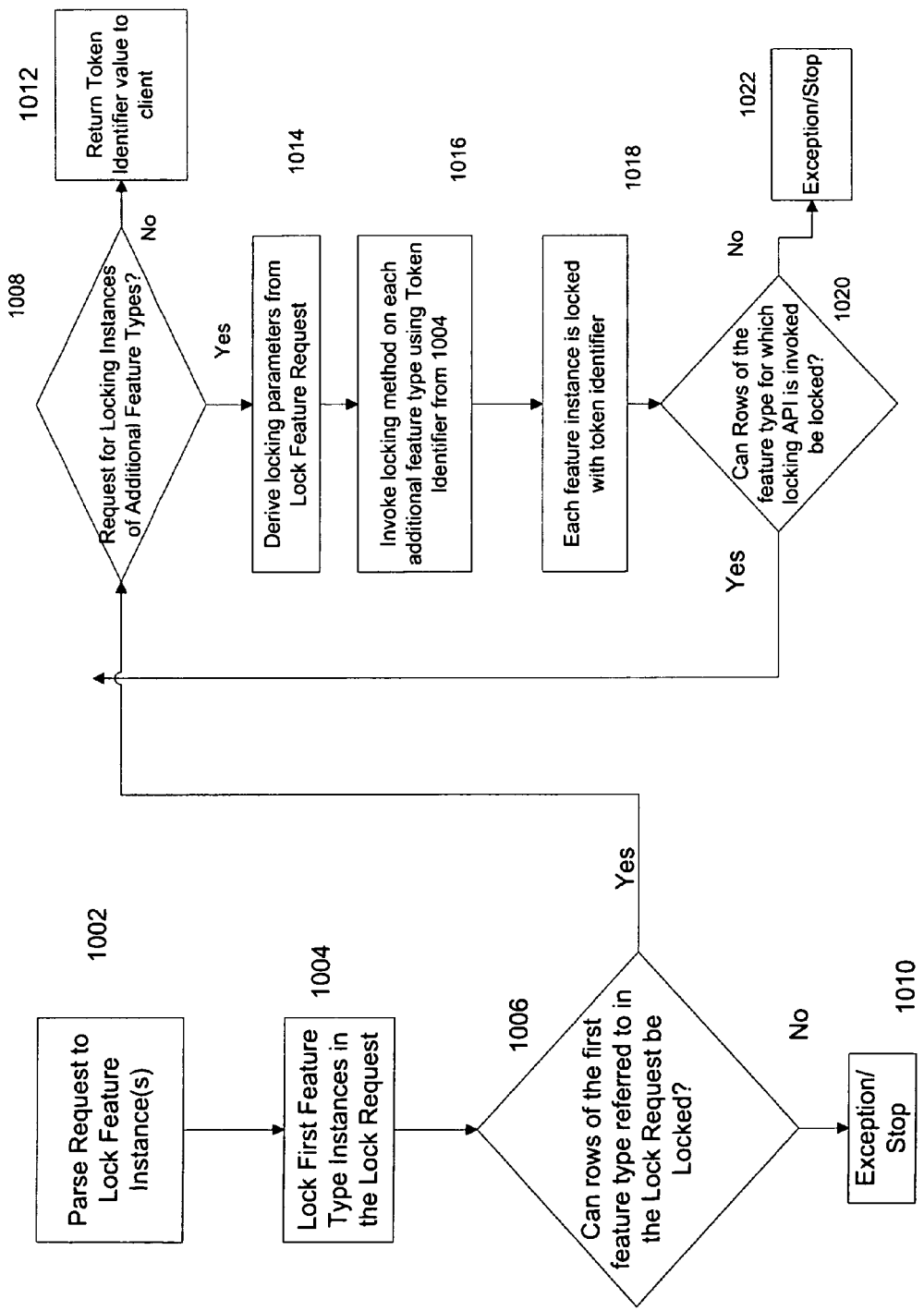
FIG. 10 is a flowchart illustrating a Web Feature Server lock feature request process incorporating features of the disclosed embodiments.

On example of processing a WFS LockFeature request in accordance with the disclosed embodiments is described with reference to FIG. 10. A WFS lock request, transmitted from the client application to the WFS server is parsed 1002 to identify table and filter information, and other parameters of the request. The request, which in one embodiment can generally be in the form of a LockFeature or GetFeatureWithLock request, is a request for a lock on one or more feature types that are specified with an associated filter. For the first feature type in the lock request the table name is identified. In one embodiment, the table name, also described as feature tableName is derived from the feature type name. The filter condition associated with the first feature type is identified. The filter condition generally defines a restriction on the query and allows the selection of features. In one embodiment, a whereClause is generated from the filter condition associated with the first feature type. The table alias used in the whereClause needs to be passed in the lock rows request.

A lock action parameter value, which can be either true or false, is generated from a lockAction parameter of the request. The lock action parameter can be ALL or SOME, corresponding to the lockAll value true or false, respectively. If the parameter is ALL, all of the instances of the feature types specified in the request must be able to be locked for the request to be successful. If the parameter is SOME, then only those instances of the feature types that can be locked (i.e. not currently locked) are locked for the request to be successful.

A lock expiration time or the duration of the lock request, can also be determined from the request. In one embodiment, this comprises deriving an expiryTime from the lockRequest expiry attribute of the request.

Since the WFS server commits changes at the end of processing a transaction request, the auto-commit parameter is passed as false in the lock rows request. Once all necessary information is derived from the request to identify the feature instance and the locking parameters, a lock is generated 1004 to lock the first feature type instance in the lock request. This generates a token identifier that can be returned to the client, and can be used for other locking invocations, such as for example locking each additional feature type.

In one embodiment, this comprises invoking a lockrows request. An identifier will be returned 1004 to the WFS server from the locking model API, an example of which is described in U.S. patent application Ser. No. 11/388,310 filed on Mar. 24, 2006. The identifier will uniquely associate the lock on the feature instance with the invoking client session. In one embodiment, the identifier is a token identifier generated by the API TokenID=lockRows(tableName, tableAlias, whereClause, expiryTime, . . . lockAll, false).

It is then determined 1006 whether all of the rows requested to be locked, based on the lockAction parameter ALL, can be locked, meaning that one or more of the requested rows are not already subject to a prior lock. If the lock action is ALL, then all of the feature instances requested need to be locked. If the lock action is some, then not all of the feature instances need to be locked for the process to proceed. If all of the rows cannot be locked, the process stops 1010 and an exception is raised. If all the rows can be locked it is determined 1008 whether there are more feature type instances to be locked in this lock request. If there are more feature type instance(s) to be locked, for every other feature type in the lock request, the required locking parameters are derived 1014. For example, the table name (tableName) for each feature is identified from the feature type name. The corresponding whereClause is generated from the filter condition associated with the corresponding feature type. The lockAll parameter value, true or false, is generated from lockAction attribute value (ALL OR SOME). The expiration time attribute of the lock request (expiryTime) is derived and the auto-commit value is passed as false.

Using these parameters, the lock rows API of the disclosed embodiments is invoked 1016 using the token identifier generated from the first feature type lock rows call. In one embodiment, this API can comprise lockRows(tokenID, tableName, tableAlias, whereClause, expiryTime, . . . , lockAll, false). This locks the feature instance for the feature type and associates the lock with the invoking session to provide a long transaction lock on each feature type that is persistent and transferable across session boundaries. If all of the rows requested to be locked cannot be locked 1020, and the lock action parameter was ALL, meaning that all of the feature instances requested need to be locked, and exception is raised and the request will terminate. If the lock action parameter is SOME, then not all of the requested feature instances need to be locked.

It is determined 1008 if there are any more feature type instances that need to be locked, which are part of the lock request. If there are no more feature type instances to be locked, then a response is returned to the client that includes the token identifier value so it can be used by the client in future requests or to transfer the lock. If the lock action value was SOME, then the response can also include a list of feature types that were locked as a result of the request and those that were not locked.

Figure 4:
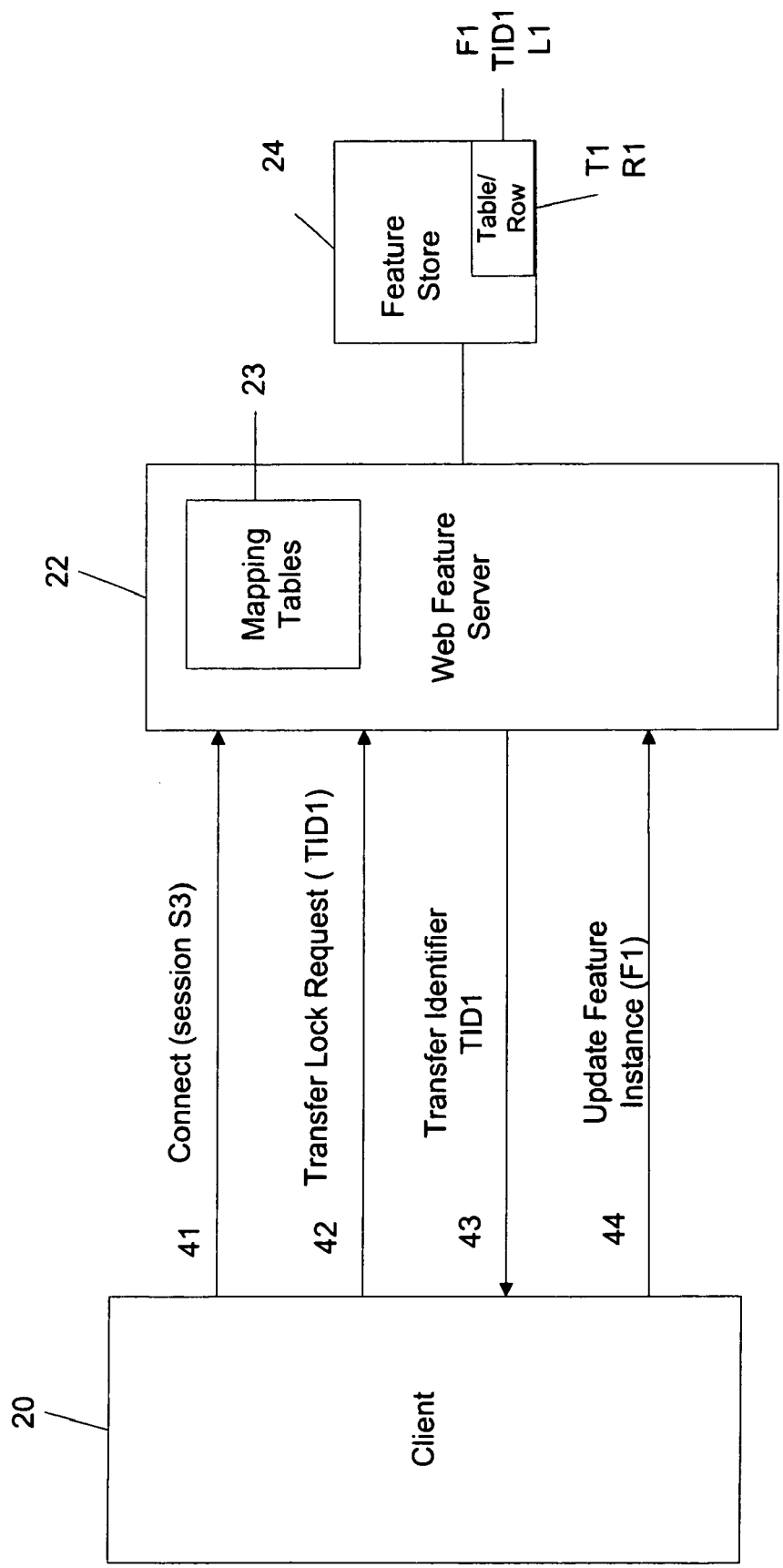
FIG. 4 is a block diagram illustrating one embodiment of a successful lock transfer across multiple sessions in a system incorporating features of the disclosed embodiments.
Figure 7:
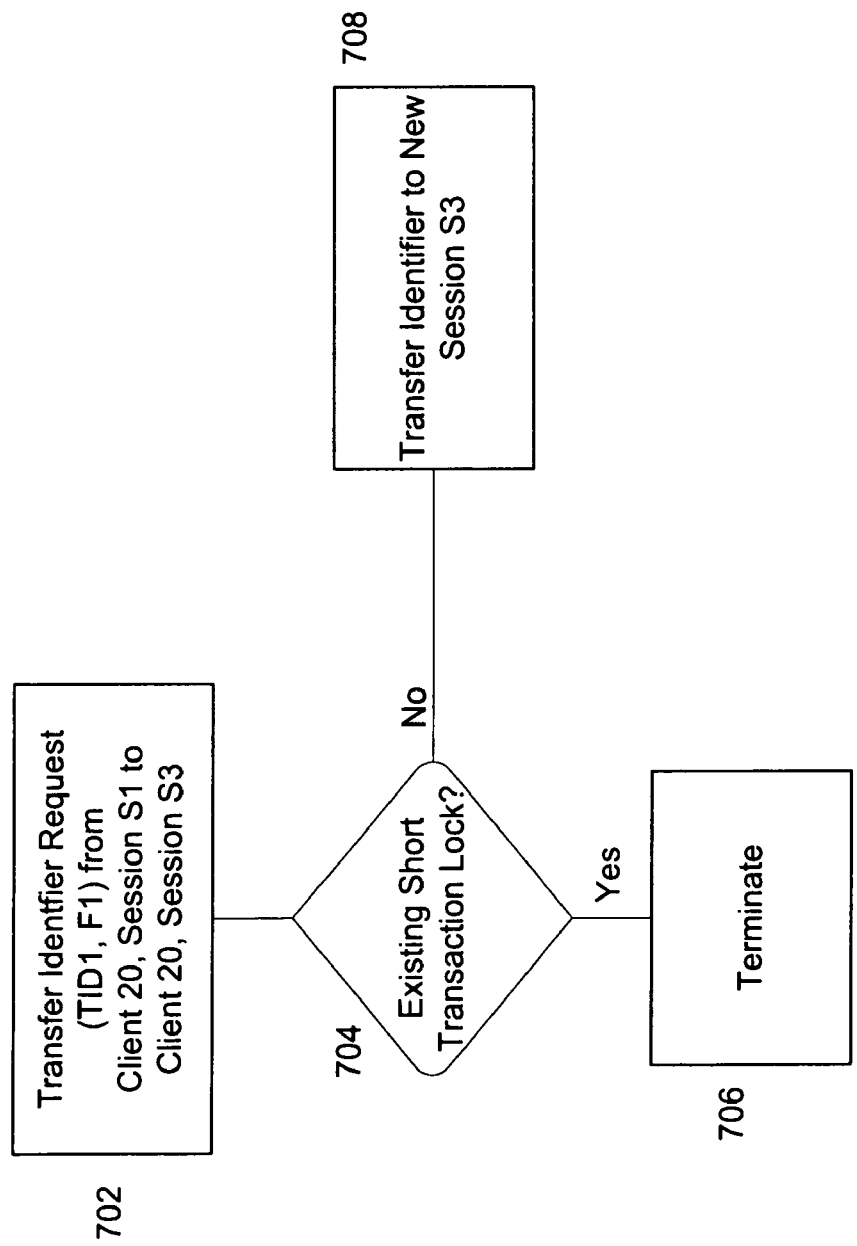
FIG. 7 is a flowchart illustrating one embodiment of a method for transferring an identifier from one session to another session in a system incorporating features of the disclosed embodiments.

The long transaction locking mechanism of the disclosed embodiments allows the lock on a feature instance(s) to be transferred from one session to another session without having to release the lock. For example, if at a future point in time the WFS client 20, from a different web request/session, wants to update the same feature instance(s) F1 for which it had earlier obtained a lock, the WFS Server 22 can transfer ownership of the identifier TID1 associated with the lock on the feature instance F1 from the first session S1 to this different session without interruption of the lock. As shown in FIG. 2, client 20 in session S1, owns lock L1 on feature instance F1, which is associated with identifier TID1. Referring to FIGS. 4 and 7, client 20 now starts another session S3 and wants to update feature instance F1 from this session S3. In one embodiment, client 20, from session S3, requests 702 that the identifier TID1 be transferred from session S1 to session S3. The transfer identifier or transfer lock request 702 is made using or referencing the identifier TID1 in the transfer request. It is determined 704 whether any of the feature instances F1 in session S1 are locked by a short transaction lock. A short transaction lock could generally mean that session S1 is currently updating the feature instance F1. If there are no short transaction locks, the identifier TID1 will be transferred 708 to the new session S3, and the session S3 will now be identified as the owner of identifier TID1 associated with the lock on feature instance F1. After the hand-off of the identifier TID1 from session S1 to session S3, the session S3 can update the feature instance F1, since the session S3 is matched as the owner of the lock of feature instance F1 when session S3 attempts to update the feature instance F1. If a short transaction lock exists on feature instance F1, the request 702 will terminate 706.

In one embodiment, the transfer of the identifier TID1 from session S1 to another session S3 can be executed by invoking the transferToken (p_tokenId number) API. This will make the different database session, S3, the owner of the identifier TID1, provided that all of the feature instances locked by the identifier are not currently locked by a short transaction database lock. Once the new database session S3 owns the identifier TID1, the new database session S3 can update/delete feature instances that are locked by the lock associated with the transferred identifier TID1. After the update/delete is complete, the WFS Server 22 can optionally choose to unlock the feature instance(s) at the end of the request using for example, the unlockRows( ) API, based on the client web request releaseAction parameter value as explained before. A successful transfer or sequential hand-off of the token TID1 from session S1 to session S3 marks a seamless release of ownership of the identifier TID1, and the lock L1, by client 20 in session S1 to client 20 in session S3.

Figure 3:
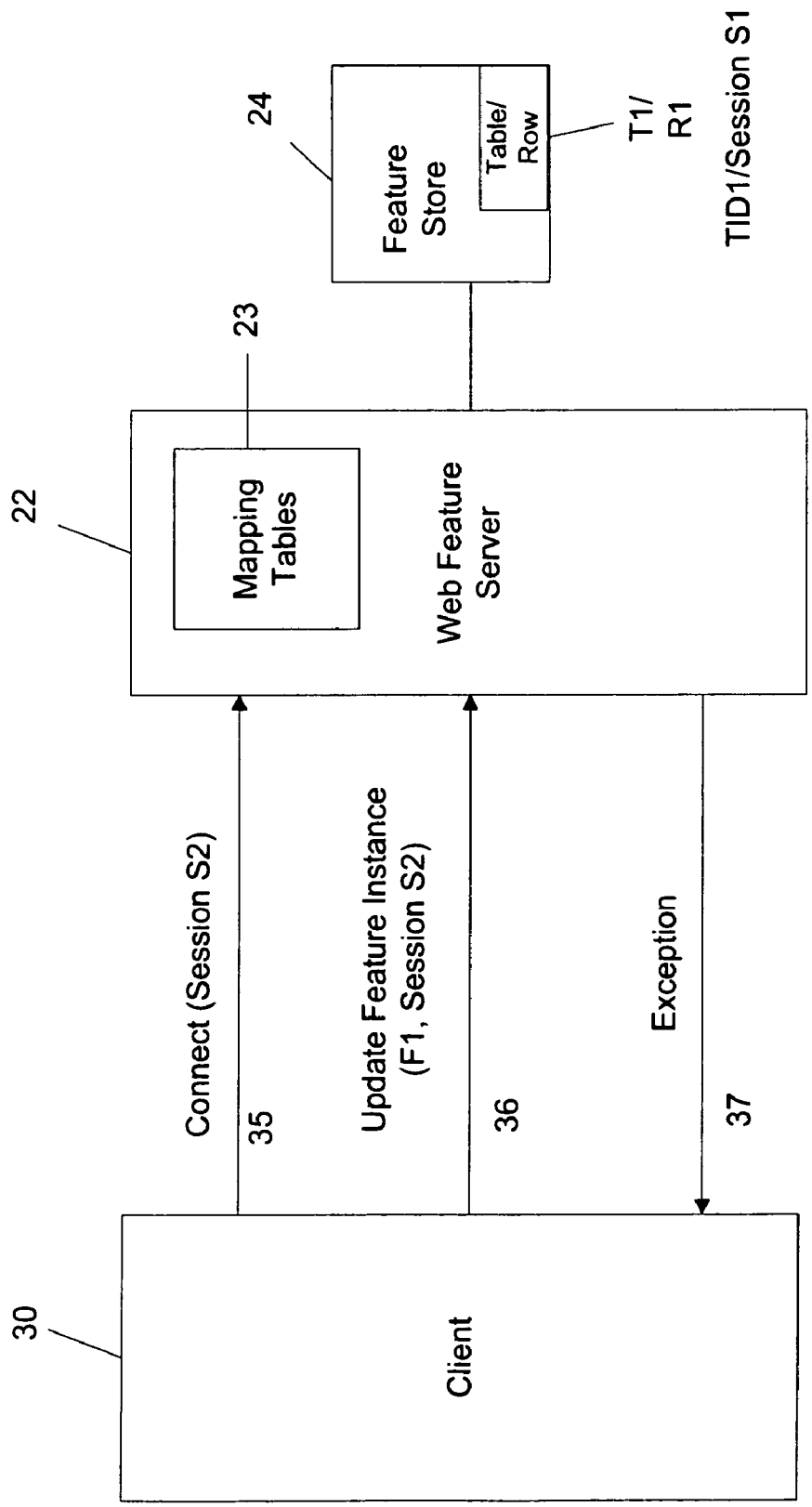
FIG. 3 is a block diagram illustrating one embodiment of an unsuccessful update/delete in a system incorporating features of the disclosed embodiments.

Only the current owner of the lock on the feature instance can execute a transaction on the locked features. Referring to FIG. 3, if a different client 30 attempts to update the feature instance F1 without first obtaining ownership of the lock on the feature instance F1, the update attempt will fail. For example, client 30 establishes 35 a session S2 with web feature server 22 and attempts to invoke 36 an update/delete on feature instance F1. Referring also to FIG. 5, in response to the lock feature instance request 36, the web feature server 22 will identify 518 the identifier TID1 as the owner of the lock associated with feature instance F1. The mapping tables 23 will identify the mapping as (F1, TID1). The web feature server 22 will then identify 520 the session that owns the identifier TID1 associated with feature instance F1. In this example, the map table 23 will show the mapping as (S1, TID1). The current session S2 will be identified 522 as the session making or invoking the update feature instance request 36 for feature instance F1. When the respective session identifiers S1, S2 are compared 524, they will not match. The web feature server 22 will raise an exception 37 and the lock feature instance and update request generated by session S2 for feature instance F1 will be unsuccessful and terminate 528.

In order for the client 30 in session S2 to update the feature instance F1 that is subject of the lock held by client 20 in session S1 (of FIG. 2), the new or different client 30 can request a transfer of the identifier TID1, from client 20 in session S1 to client 30 in session S2. However, client 30 will not be able to request a transfer of the identifier TID1 without having previously obtained the identifier information, TID1, from client 20 is session S1. If client 20 is ready to pass ownership of the lock on, it can advise client 30 of the lock identifier, TID1.

Figure 8:
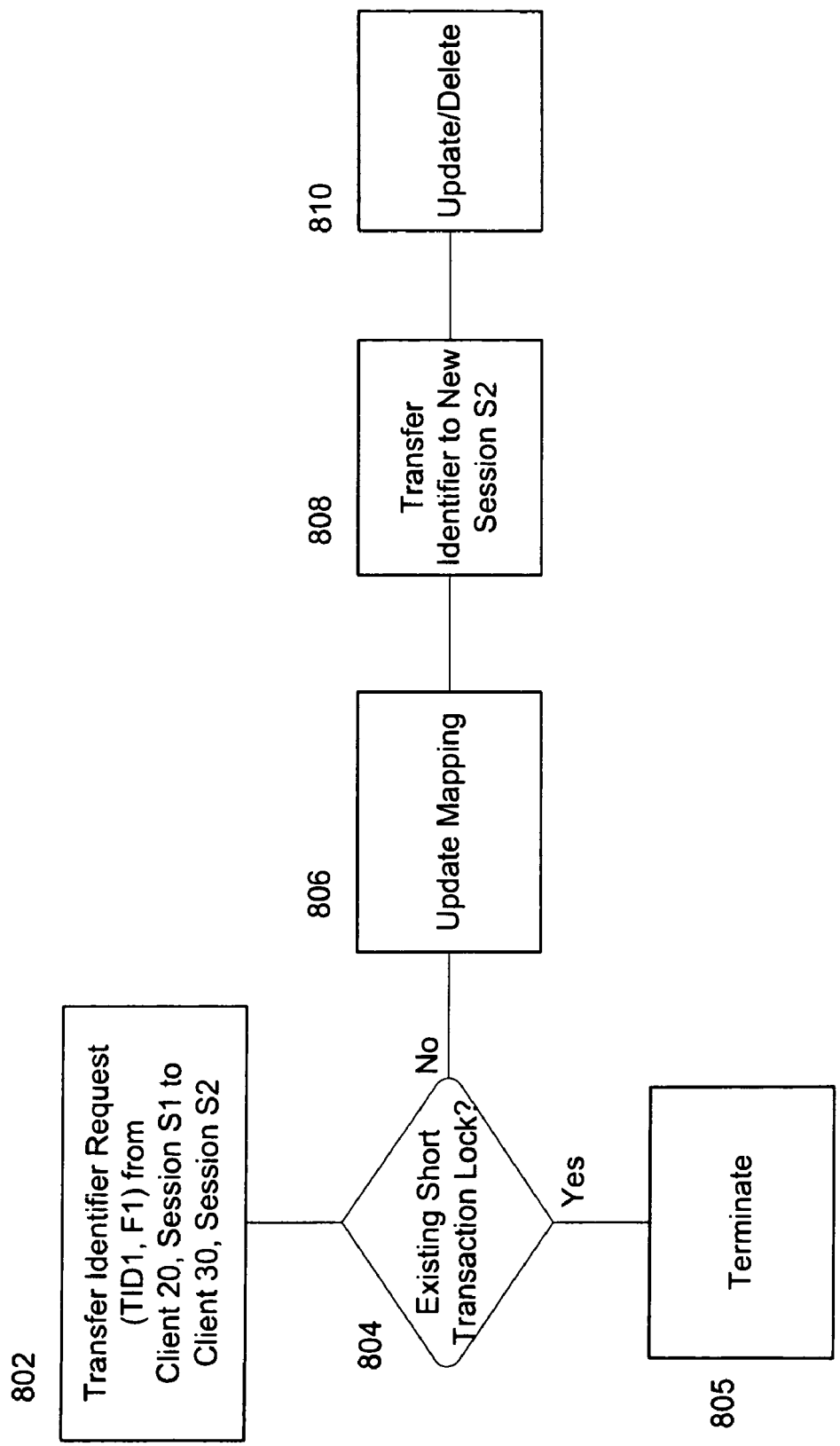
FIG. 8 is a flowchart illustrating one embodiment of a method for transferring a identifier across multiple sessions in a system incorporating features of the disclosed embodiments.

Since the client 20 has not explicitly released the original lock on feature instance F1, the identifier TID1 remains associated with the feature instance F1 and session S1. The session mappings in mapping table 23 are (F1, TID1) and (S1, TID1). Referring also to FIG. 8, while in the new session S2, the client 30, having knowledge of the token identifier TID1, invokes a transfer identifier request 802, to transfer the identifier TID1 from session S1 to session S2. If it determined 804 that the feature instance F1 does not have an existing short transaction lock in place, the web feature server 22 will change 806 the mapping in the mapping table 23 from (S1, TID1) to (S2, TID1). The feature instance map entry (F1, TID1) created and stored in the web feature server 22 from the original lock feature instance request remains unchanged. Thus, the respective mappings are now (F1, TID1) and (S2, TID1). The changes to the session mapping table will only take place if the feature instance F1 does not have a short transaction lock or regular database update lock on it. If the feature instance F1 does have another lock on it, the web feature server 22 will raise an exception, and the transfer request 802 will terminate 805, after a predetermined timeout period expires.

If the transfer request 802 is successful, ownership of identifier TID1 now resides 808 with the session S2, and the client 30 will be able to execute transactions, such as update 810, on the feature instance F1 from session S2. Now, referring again to FIG. 5, when the update feature instance request 36 of FIG. 3 is executed, the identifier TID1 will be identified 518 as being associated with feature instance F1 and the session S2 will also be identified 520, from the mapping table 23. Since the session executing the update is determined 524 to match the session identified as owning the identifier TID1 associated with the feature instance F1, the update is allowed 526 to execute. Thus, the lock on a feature instance can be held across multiple database sessions.

Figure 11:
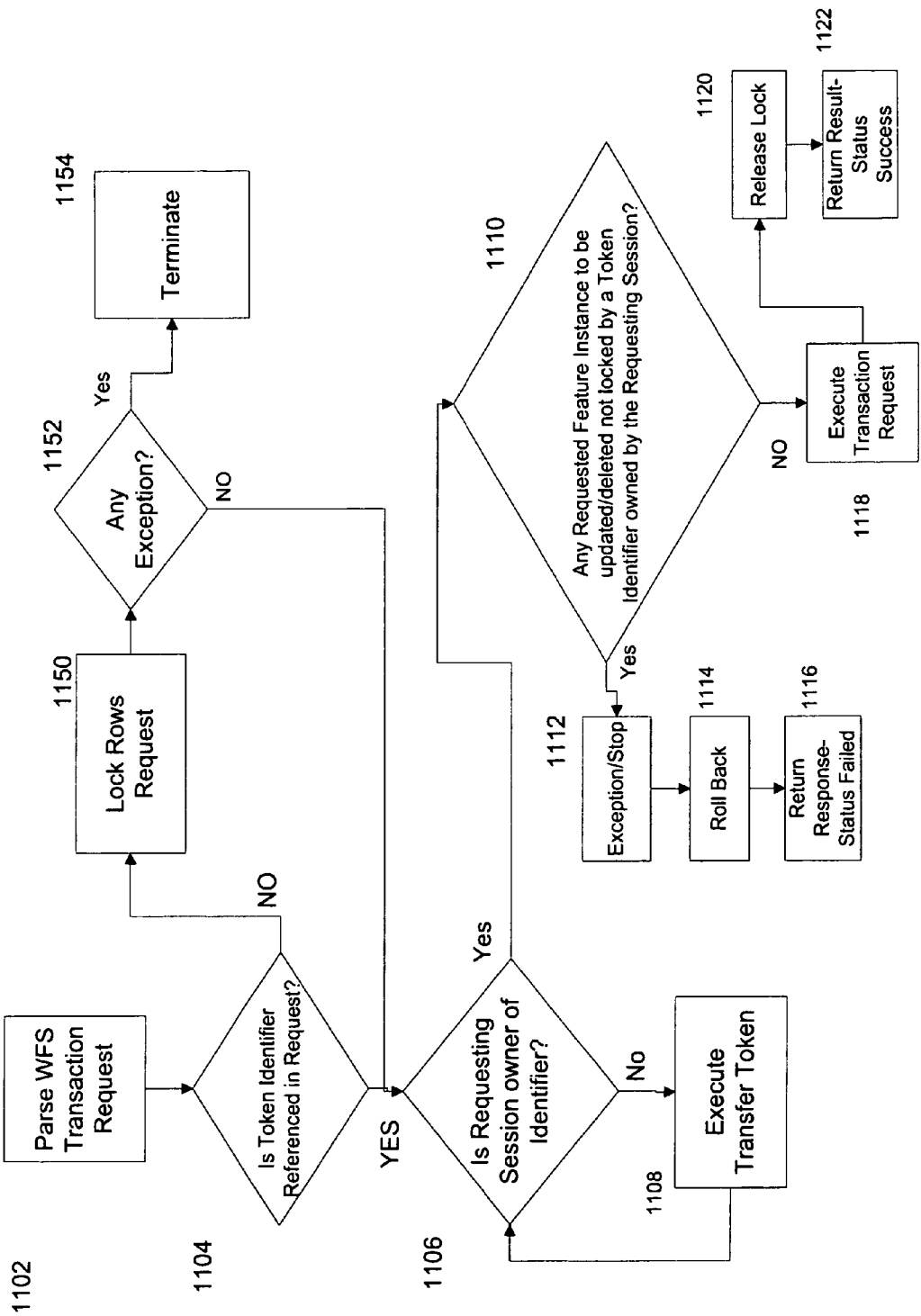
FIG. 11 is a flowchart illustrating a Web Feature Server transaction request process incorporating features of the disclosed embodiments

FIG. 11 illustrates one example of processing a WFS transaction in accordance with the features of the disclosed embodiments. The WFS Transaction request is parsed 1102. The transaction request generally includes one or more transaction operations to be executed with respect to modifying feature information. These can include for example, Update, Delete or Insert. In one embodiment, a WFS transaction request is made up of a List<Update|Delete|Insert>sub-requests. Each Update sub-request has a feature type name and a list of property nodes which determines how the feature instance attributes need to be updated. The update sub-request will also have a filter condition that determines which feature instance should be updated. Each Delete sub-request has a feature type name, and a filter condition that determines which feature instance should be deleted. Each Insert sub-request has a feature type name, and the content of the feature type instance that needs to be inserted.

If a token identifier is referenced 1104 in the transaction request, it is determined 1106 if the requesting session is the owner of the token identifier. If the current session is not the owner of the token identifier, a transfer token operation in accordance with the features of the disclosed embodiments is carried out 1108 so that the current session becomes the owner of the token identifier.

If any of the feature instances that are requested to be updated or deleted in the transaction request are not locked 1110 by the lock associated with the token identifier owned by the current session, then an exception is raised 1112 and the processing of the transaction can terminate or stop. Any changes or modifications to the database made so far will be rolled back 1114. A response, such as Return Transaction Response with status FAILED, can be returned 1116 to the client.

Once the current session is determined to be the owner of the token identifier, any Update/Delete sub-request in the transaction request is executed 1118. This can include for example, Update <tableName> set <update_attributes> where <whereClause> or Delete from <tableName>where <whereClause>, where <tableName> is derived from the feature type name. The <whereClause> is derived from the associated filter condition, and the <update_attributes> is derived from the property children nodes of the update request, as specified in the Transaction Request. For all Insert sub-requests, the new feature instance is inserted into the appropriate feature table. The feature table name is derived from feature type name.

After the transaction has been executed, the locks on the feature instances can be released 1120. If the releaseAction attribute of the current WFS Transaction Request is SOME, then the locks on all the rows updated by the transaction can be released. In one embodiment, this comprises calling the API unlockRows(tableName, tableAlias, whereClause, autocommit(=false)) for each update/delete request processed in the transaction. The parameter TableName is derived from the featureType Name, the whereClause is derived from the filter condition, the tableAlias used in the whereClause is passed as is in the unlockRows( ) API call, and the autocommit is passed as false in the unlockRows( ) API call as the WFS Server will commit the modifications at the end of processing the WFS transaction request.

If the releaseAction attribute of the current WFS Transaction Request is ALL, then all of the locks on the rows locked by the tokenId are unlocked after execution of the transaction request. In one embodiment, this comprises deleting the TokenSessionMap entry for the tokenId. This can be accomplished by, for example, delete from TokenSessionMap t where t.tokenId=tokenId, which in turn cascade deletes the corresponding entries in the RowTokenMap for this TokenId.

After the locks are releases, a Return Transaction Response can be sent back 1122 to the client with an indication of the status as successful If the token identifier is not present 1150 in the initial transaction request, locks are acquired 1152 on the rows to be updated/deleted using the lockFeature request algorithm of the disclosed embodiments and described previously herein. For each feature type, filter condition pairs for the feature type whose instances need to be updated or deleted, locks will be acquired on the corresponding feature instances. In a transaction request involving multiple feature types and filter conditions, a token identifier can be returned in response to the lock feature (lock rows) request for the first (feature type, filter condition). In one embodiment, this can comprise the tokenId=lockRows( . . . ). For the remaining feature types, the token identifier generated by the first lockrows( ) is used in the transaction request to lock each subsequent feature instance.

For the remaining feature types in the transaction request, the transaction request parameters can be adjusted so that the a) the lockAction value is ALL and the lockAll should be true. b) The lock duration, expiryTime, is a default value which can be specified per application. This time can be for example, a few minutes bounded by the maximum time the transaction is typically expected to take for processing. Generally, the locks imposed will be removed explicitly at the end of the transaction, via for example an unLockRows( ) call.

If any exception is raised 1152 during the locking of the request features, and exception can be raised and execution of the request terminated 1154. Any changes made to the database will be rolled back and a Return Transaction Response can be generated that indicates the status of the transaction request as failed.

Once the lock has been established, the operations requested in the transaction request are executed 1118 as previously described. Once all of the operations set forth in the transaction request are executed, the locks on all the rows locked by the tokenId are released. The changes are committed and the Return Transaction Response indicates that the status of the transaction is success.

If a feature type is dropped then the WFS Server 22 can also unregister a feature table T1. Unregistering a feature table generally comprises using a procedure that will drop any triggers defined on that table. In one embodiment, this comprises invoking the unRegisterFeatureTable(p_userName (IN), p_featureTable (IN)) API. This will disable long transaction locking capability on that feature table T1.

Figure 9:
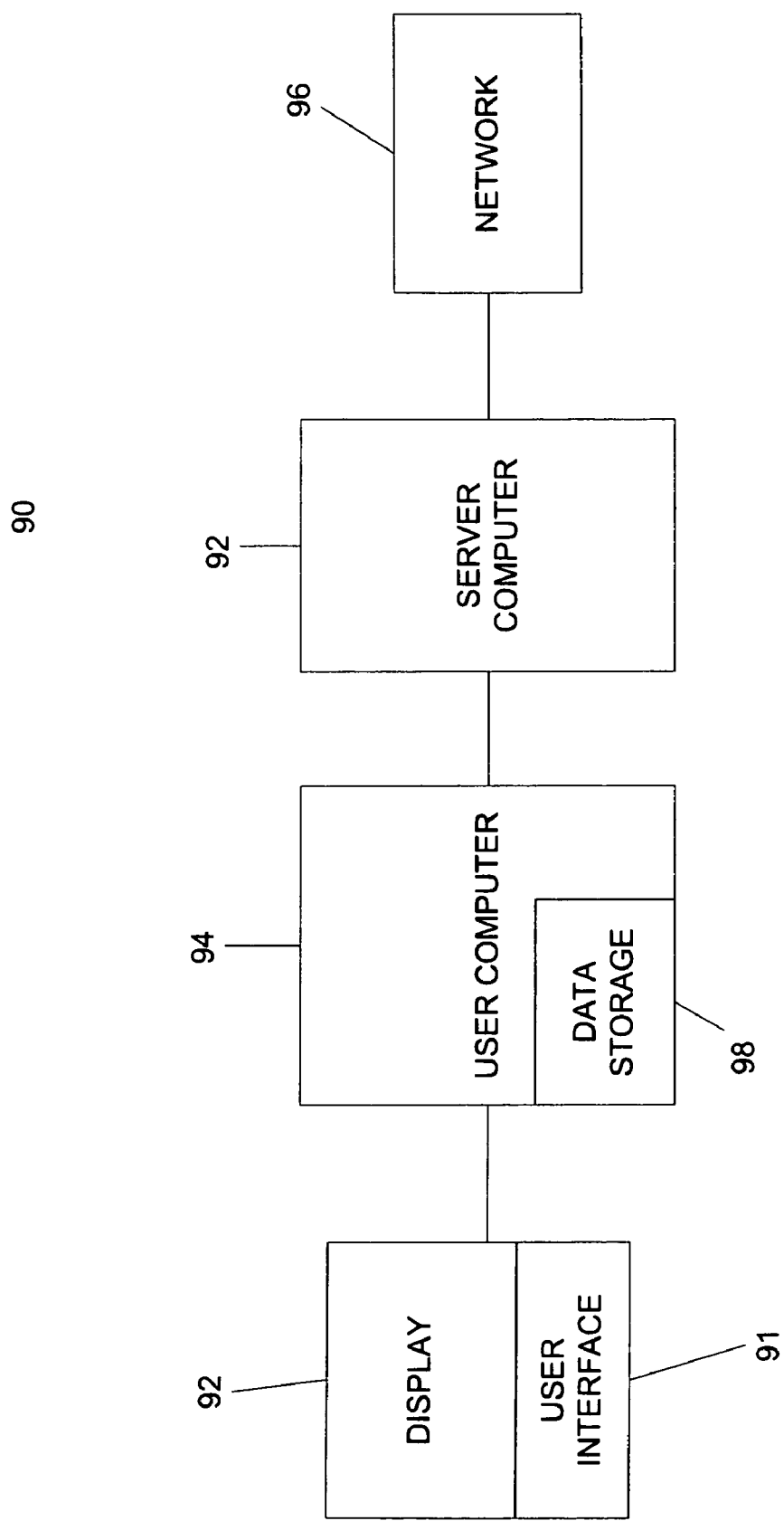
FIG. 9 is a block diagram of one embodiment of an architecture that can be used to practice the disclosed embodiments.

The disclosed embodiments may also include software and computer programs incorporating the process steps and instructions described above that are executed in different computers. FIG. 9 is a block diagram of one embodiment of a typical apparatus incorporating features of the disclosed embodiments that may be used to practice the disclosed embodiments. As shown, a computer system 90 may be linked to another computer system 92, such that the computers 90 and 92 are capable of sending information to each other and receiving information from each other. In one embodiment, computer systems 90 and 92 could include or be connected to a server computer adapted to communicate with a network 94, such as for example, the Internet. Computer systems 90 and 92 can be linked together in any conventional manner including a modem, hard wire connection, or fiber optic link. Generally, information can be made available to both computer systems 90 and 92 using a communication protocol typically sent over a communication channel or through a dial-up connection on ISDN line. Computers 90 and 92 are generally adapted to utilize program storage devices embodying machine readable program source code which is adapted to cause the computers 90 and 92 to perform the method of the disclosed embodiments. The program storage devices incorporating features of the disclosed embodiments may be devised, made and used as a component of a machine utilizing optics, magnetic properties and/or electronics to perform the procedures and methods of the disclosed embodiments. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 90 and 92 may also include a microprocessor for executing stored programs. Computer 90 may include a data storage device 96 on its program storage device for the storage of information and data. The computer program or software incorporating the processes and method steps incorporating features of the disclosed embodiments may be stored in one or more computers 90 and 92 on an otherwise conventional program storage device. In one embodiment, computers 90 and 92 may include a user interface 97, and a display interface 98 from which features of the disclosed embodiments can be accessed. In one embodiment, the user interface and the display interface 98 comprise a single interface device. The user interface 97 and the display interface 98 can be adapted to allow the input of queries and commands to the system, as well as present the results of the commands and queries.

The disclosed embodiments enable a web feature service to hold exclusive update locks on feature instances for any period of time across multiple database sessions, without the need to maintain copies of different versions of the feature instances. The disclosed embodiments allow a WFS server to derive the long transaction locking model API invocation parameters from different WFS lock feature requests. A long running session, or web request, which owns the lock (as determined by the associated identifier) on the feature instance is the only session that can update the feature instance. Other sessions may view those feature instances, including any changes that are committed. However, a session other than the owner of the lock cannot execute an update/delete, or similar transaction, on the feature instance(s). Ownership of the long transaction lock can be transferred or handed off to another session, without having to release the lock during the transfer.

What is claimed is:

1. A method of locking a feature instance in a web feature service in a computing device comprising:
   processing a web feature service data transformation request in the computing device;
   identifying a table associated with the web feature service data transformation request from a feature type identified in the request;
   determining if the table associated with the web feature service data transformation request is enabled for long transaction locking; and, if the table is long transaction lock enabled:
   locking at least one feature instance associated with a filter condition of the web feature service data transformation request by associating a session transferable identifier with the at least one feature instance and identifying a client session as owner of the session transferable identifier; and
   enabling a transfer of a long transaction lock to another client session in response to a lock transfer request from the another client session that references the session transferable identifier in a web feature service transaction request.

2. The method of claim 1 further comprising:
   transferring the long transaction lock to another client session by:
   matching an identifier of the session associated with the lock on the at least one feature instance with an identifier associated with the another client session; and
   transferring the long transaction lock to the another client session of there is a match and the at least one feature instance is not currently locked by a short transaction lock.

3. The method of claim 1 further comprising:
   storing an association of the feature instance and the session transferable identifier in a mapping table;
   storing an association of the client session and the session transferable identifier in the mapping table; and, in response to an update feature instance request:
   matching, from the mapping table, a session transferable identifier associated with the feature instance identified in the update feature instance request, to a session associated with the session transferable identifier corresponding to the request;

matching a session associated with the request to the session matched to the session transferable identifier corresponding to the request, and if there is a match executing the update request.

4. The method of claim 1 further comprising:

issuing a request from a new client session for a transfer of the session transferable identifier from the client session to the new client session;

determining if the feature instance associated with the session transferable identifier is locked by a short transaction lock; and if not, transferring ownership of the session transferable identifier from the client session to the new client session and allowing the new client session to update the feature instance.

5. The method of claim 4 wherein transferring ownership of the session transferable identifier comprises updating the mapping table to associate the new client session with the session transferable identifier.

6. The method of claim 1 further comprising maintaining the lock until an expiration of the predetermined period of time or until the session transferable identifier is released by the client session.

7. The method of claim 1 further comprising:

selecting at least one additional feature instance to be associated with the session transferable identifier;

determining if the at least one additional feature instance is locked by a short transaction lock, and if not associating the at least one additional feature instance with the session transferable identifier, wherein the client session is identified as the owner of the session transferable identifier associated with both the at least one feature instance and the at least one additional feature instance.

8. The method of claim 1 further comprising verifying, prior to executing a delete or update to the feature instance, that a current session has authorization to perform the delete or update using a database triggering mechanism that identifies a session transferable identifier associated with the feature instance in an update feature instance request; identifies a session associated with the feature instance in the update feature instance request; and matches the session associated with the feature instance in the update feature instance request to the current session invoking the update feature instance request.

9. The method of claim 1 further comprising transferring authorization to update/delete the feature instance to another session by transferring the identifier to the destination session from the client session that is currently authorized to update/delete the feature instance.

10. The method of claim 1 further comprising transferring ownership of the long transaction lock from a current client session to another session by:

requesting, from a destination session, a transfer of the identifier associated with the long transaction lock from the current client session to the destination session;

transferring ownership of the identifier to the destination session from the current session, the transfer being carried out if the current session does not have a short-transaction database lock on the feature instance associated with the identifier.

11. The method of claim 1 further comprising:

receiving a request to change data in a feature instance;

executing the change request only if the identifier associated with the feature instance and a corresponding session is owned by a session requesting the change.

12. A method in a computing device for locking multiple feature instances in a single web feature service data transaction request from a client comprising:

locking, in the computing device, a first feature instance identified in the request;

generating, in the computing device, an identifier that is associated with the lock on the first feature instance and returning the identifier to the client;

locking each subsequent feature instance using the identifier;

determining if the feature instance identified in a lock transfer request by another session is locked by a short transaction lock; and if not, matching an identifier associated with the transfer request to the identifier associated with the identifier of the invoking session associated with the feature instance that is the subject of the request; and if they match, associating the lock with another client session and enable the feature instance to be updated in the another client session.

13. The method of claim 12, further comprising:

determining whether all or some of the feature instances in the transaction request are required to be locked as part of the request;

generating an error if all feature instances required to be locked cannot be locked; and locking a subset of the feature instances in the transaction request that are not already locked if only some of the feature instances are required to be locked.

14. The method of claim 13 further comprising:

updating or deleting the feature instance that are locked as part of the web feature service transaction request; and releasing the lock on all rows of the feature instance that are associated with the identifier.

15. The method of claim 13 further comprising:

updating or deleting the feature instance that is locked as part of the web feature service transaction request; and releasing the lock on only those rows of the feature instance that are updated, while rows not updated in the transaction request remain locked.

16. The method of claim 12, further comprising:

identifying a table name for the first feature instance in the request; identifying filter parameters associated with the request; and locking each row of the first feature instance in the table.

17. The method of claim 12, further comprising requesting additional feature instances to be locked and associating a lock on the additional feature instances with the identifier associated with the invoking session, if the additional feature instances are not already locked by a transaction lock.

18. A method for long transaction locking of feature instances in at least one computing device comprising:

using the at least one computing device to request to update at least one feature instance;

generating, in the at least one computing device, a long transaction lock on the feature instance by:

registering a table storing feature instances as a feature table for enabling long transaction locks;

selecting the at least one feature instance for update and requesting a lock in a client session;

determining if the at least one feature instance is associated with another nonexpired long transaction lock, and if not, locking the at least one feature instance by associating a session transferable identifier with the at least one feature instance and identifying the client session as owner of the session transferable identifier; and enabling a transfer of the long transaction lock to another client session in response to a lock transfer request from the another client session that references the session transferable identifier.

19. The method of claim 18 further comprising transferring the long transaction lock to another client session by matching an identifier of the session associated with the lock on the at least one feature instance with an identifier associated with the another client session; and transferring the long transaction lock to the another client session of there is a match and the at least one feature instance is not currently locked by a short transaction lock.

20. A computer program product comprising:

a computer useable medium having computer readable code means embodied therein for causing a computer to maintain a long transaction lock across multiple database sessions in a web feature service system, the computer readable code means in the computer program product comprising:

computer readable program code means for causing a computer to register a table as a feature table by generating and installing triggers on the table that allow the system to perform checks to ensure that only the session which owns a session identifier associated a feature instance can perform an update/delete on the feature instance;

computer readable program code means for causing a computer to lock the feature instance from a database session where the update is to be performed;

computer readable program code means for causing a computer to associate the feature instance of the request with an identifier, and associating the identifier with an invoking session;

computer readable program code means for causing a computer to allow any update/delete to the feature instance only by the invoking session which is associated with the identifier also associated with the feature instance being updated/deleted;

computer readable program code means for causing a computer to determine if the feature instance locked by the long transaction lock and identified in a lock transfer request by another session is locked by a short transaction lock; and if not computer readable program code means for causing a computer to match an identifier associated with the transfer request to the identifier associated with the identifier of the invoking session associated with the feature instance that is the subject of the request; and if they match, and computer readable program code means for causing a computer to associate the long transaction lock with another client session and enable updates to the feature instance from the another client session.

\* \* \* \* \*

UNITED STATES PATENT AND TRADEMARK OFFICE
CERTIFICATE OF CORRECTION

| | |
|---|---|
| PATENT NO. | : 7,747,591 B2 |
| APPLICATION NO. | : 11/388308 |
| DATED | : June 29, 2010 |
| INVENTOR(S) | : Raja Chatterjee et al. |

It is certified that error appears in the above-identified patent and that said Letters Patent is hereby corrected as shown below:

In column 3, line 44, after "embodiments" insert -- . --.

In column 6, line 23, delete "p_lockall" and insert -- p_lockAll --, therefor.

In column 7, line 39, delete "lockrows" and insert -- lockRows --, therefor.

In column 7, line 43, delete "lockrows" and insert -- lockRows --, therefor.

In column 9, line 1, Delete "lockrows" and insert -- lockRows --, therefor.

In column 12, line 42, after "succesful" insert -- . --.

In column 12, line 55, delete "lockrows" and insert -- lockRows --, therefor.

In column 16, line 62, in claim 18, delete "nonexpired" and insert -- non-expired --, therefor.

Signed and Sealed this
Third Day of May, 2011

David J. Kappos
*Director of the United States Patent and Trademark Office*